United States Patent

Kuratani

Patent Number: 5,852,950
Date of Patent: *Dec. 29, 1998

[54] CAM DEVICE HAVING BACKLASH REVERSAL SUPPRESSION MEANS

[75] Inventor: Yasushi Kuratani, Inashiki-gun, Japan

[73] Assignee: Riso Kagaku Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 656,964

[22] Filed: Jun. 6, 1996

[30] Foreign Application Priority Data

Jun. 13, 1995 [JP] Japan .................................. 7-170306

[51] Int. Cl.⁶ .............................. F16H 1/00; F16H 57/00; B41F 13/00
[52] U.S. Cl. ............................................. 74/440; 74/569
[58] Field of Search ...................... 74/440, 569; 101/116, 101/126, 247

[56] References Cited

U.S. PATENT DOCUMENTS

| | | |
|---|---|---|
| 2,767,652 | 10/1956 | Dietrich et al. . |
| 3,477,370 | 11/1969 | Fischer .................................. 74/440 X |
| 3,548,673 | 12/1970 | Suchocki . |
| 3,556,006 | 1/1971 | Papa et al. ............................ 74/440 X |
| 4,241,619 | 12/1980 | Cerny et al. ............................... 74/440 |
| 4,640,147 | 2/1987 | Yasukawa et al. .................. 74/440 X |
| 4,739,670 | 4/1988 | Tomita et al. ........................ 74/440 X |
| 4,747,321 | 5/1988 | Hannel . |
| 5,056,613 | 10/1991 | Porter et al. .......................... 74/440 X |

FOREIGN PATENT DOCUMENTS

| | | |
|---|---|---|
| 516885 | 1/1931 | Germany . |
| 57-110866 | 7/1982 | Japan . |
| B2-60-28670 | 7/1985 | Japan . |

*Primary Examiner*—Richard M. Lorence
*Assistant Examiner*—Saúl Rodríquez
*Attorney, Agent, or Firm*—Oliff & Berridge, PLC

[57] ABSTRACT

To prevent the generation of noise and/or vibration due to the backlash of the gear wheels in the cam device driven by a two mutually meshing gear wheels, a backlash reversal suppression means which suppresses an impulsive reversal of the backlash during transition from a rotational phase region in which the cam drives the cam follower to a rotational phase region in which the cam is driven by the cam follower is provided to operate only at a necessary portion.

4 Claims, 6 Drawing Sheets

CAM DEVICE HAVING BACKLASH REVERSAL SUPPRESSION MEANS

BACKGROUND OF THE INVENTION

1. Field of the Invention

The present invention relates to a cam device, and more particularly, a cam device wherein a cam which biases a cam follower against an elastic biasing force applied thereto is driven to rotate about a rotation axis thereof by a gear train including at least two mutually meshing gear wheels.

2. Description of the Prior Art

A cam device in which a cam adapted to be driven to rotate about its rotation axis biases a cam follower against an elastic biasing force applied thereto is conventionally used at a lot of places. Further, in many applications, as in, for example, a rotary stencil printer which carries out stencil printing by rotationally driving a printing drum while moving a press roller in synchronization with the rotational phase of the printing drum so as to be forwarded against the printing drum in a first phase of rotation thereof and to be retracted from the printing drum in a second phase of rotation thereof, such a cam device is driven to rotate about its own rotation axis by a gear train which synchronizes the cam operation with other operating mechanisms.

Figure 1:
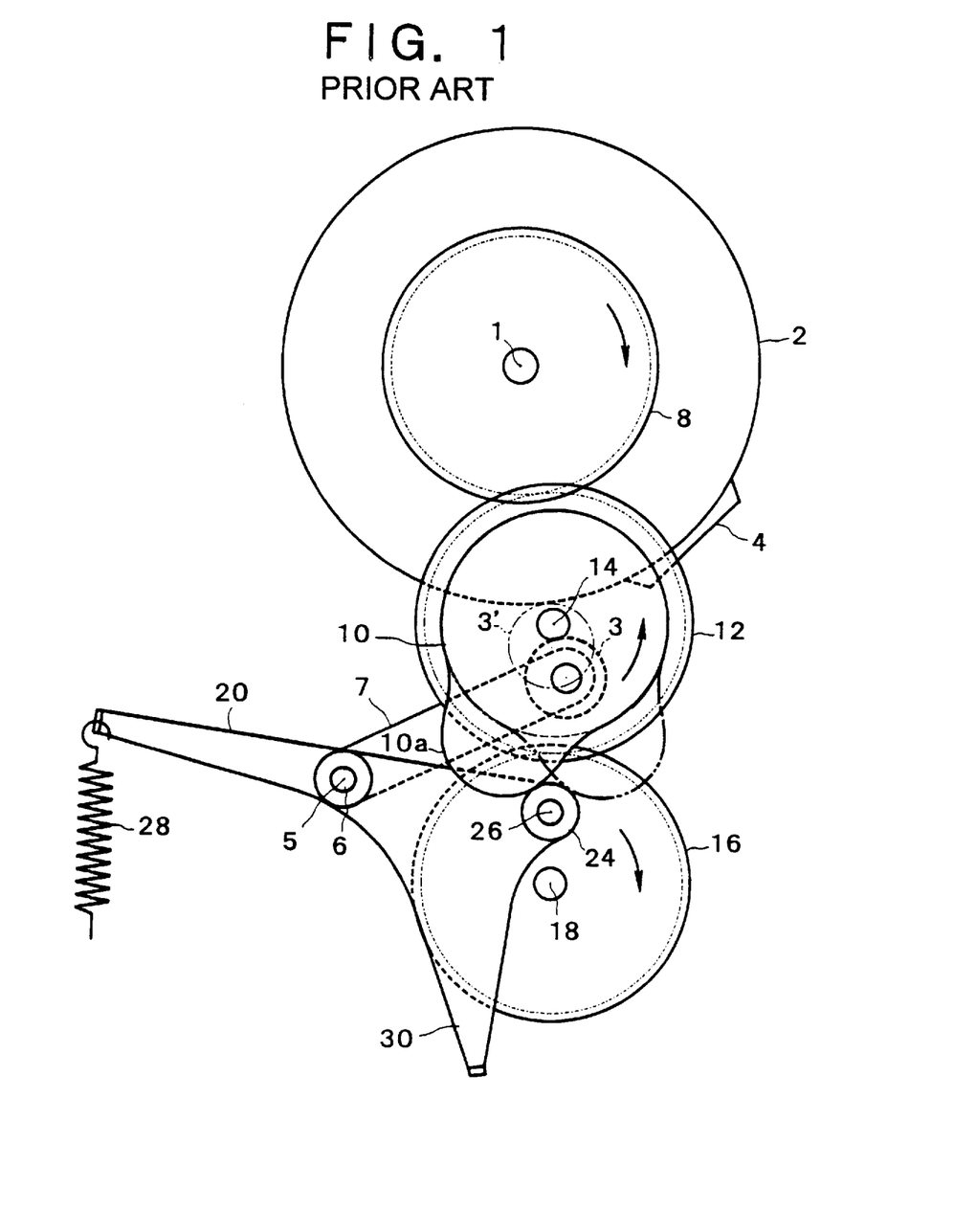
FIG. 1 is a somewhat diagrammatical side view showing an example of a mechanism concerned with a printing drum and a press roller of a rotary stencil printer.

In more detail, as shown somewhat diagrammatically in FIG. 1, a rotary stencil printer has a printing drum 2 having a circumferential portion of a perforated construction for mounting a perforated stencil sheet and mounted to rotate about its rotation axis 1, and a press roller 3 for pressing a print sheet against the printing drum, and is adapted to operate such that the printing drum 2 is rotated about the rotation axis 1, while print sheets are successively fed in between the printing drum and the press roller 3, with ink being pressedly supplied to the inside of the printing drum 2 by an ink supply means not shown in the figure, so that each of the print sheets is given a print image thereon by contact with the printing drum. In such a rotary stencil printer, since a raised base projection 4 is provided at a part of the circumference of the printing drum 2 for mounting a leading edge of the stencil sheet, the press roller 3 must be periodically retracted to be away from the printing drum 2 in synchronization with the rotation of the printing drum 2 at a phase region in which the raised base portion 4 traverses in front of the press roller, so as to avoid a collision of the press roller 3 with the raised base portion 4. Therefore, the press roller 3 is supported at one end of a pivot arm 7 held by a pivot shaft 6 at the other end thereof, wherein the pivot shaft 6 is mounted in a housing of the printer not shown in the figure to be pivotable about a pivot axis 5, and the pivot arm 7 is swung about the pivot axis 5 in synchronization with the rotation of the printing drum 2, such that the press roller 3 is forwarded to a position shown by a phantom line 3', where it contacts with the printing drum 2 during a first phase of operation which excludes a second phase of operation, in which the raised base portion 4 traverses in front of the press roller 3, while in said second phase of operation the press roller is retracted to be away from the printing drum as shown by a solid line, though, in fact, shown in a broken line, because it is located behind a cam described hereinbelow.

The above-mentioned reciprocating movement of the press roller 3 synchronized with the rotation of the printing drum 2 is readily accomplished by employing a cam device adapted to be driven to rotate in synchronization with the rotation of the printing drum 2. An example of such a cam device is shown in FIG. 1.

In FIG. 1, 10 is a cam adapted to be driven by a gear wheel 12 to rotate about a rotation axis 14 thereof integrally therewith. The gear wheel 12 meshes with a gear wheel 16 and is driven thereby about the rotation axis 14 in the anti-clockwise direction in the figure, while the gear wheel 12 drives in turn a gear wheel 8 meshed therewith and integrally rotatable with the printing drum 2 about the central axis 1 so as thereby to rotationally drive the printing drum 2 about the central axis 1. The gear wheel 16 is adapted to be driven to rotate about its rotation axis 18 in the clockwise direction in the figure as indicated by an arrow by a driving source not shown in the figure. The unitary body of the cam 10 and the gear wheel 12 and the gear wheel 16 are rotationally supported to rotate about the rotation axes 14 and 18, respectively, by a support frame not shown in the figure.

20 is a lever member supported by the pivot shaft 6 to swing about the pivot axis 5 integrally with the pivot arm 7 via the pivot shaft 6. A roller 24 is carried by the lever member 20 to be freely rotatable about its rotation axis 26. 28 is a tension coil spring having a lower end engaged to a support frame not shown in the figure and an upper end engaged with an end portion of the lever member 20, thereby applying a biasing elastic force to the lever member 20 so that it is elasticity biased about the pivot axis 5 in the anti-clockwise turning direction in the figure. When the roller 24 is not engaged with a convex portion 10a of the cam 10, the lever member 20 is turned in the anti-clockwise turning direction in the figure under the elastic biasing force of the tension coil spring 28, so as to press the press roller 3 against the circumferential surface of the printing drum 2. Although not shown in the figure, there is provided a press roller control means which acts at an arm portion 30 of the lever member 20 for retracting the press roller 3 to be away from the printing drum 2 regardless of the operation of the cam 10. When the convex portion 10a engages the roller 24, the lever member 20 is pivoted about the pivot axis 5 in the clockwise turning direction in the figure against the elastic biasing force of the tension coil spring 28.

In the condition shown in FIG. 1, the cam convex portion 10a is going to engage the roller 24, wherein the cam 10 is pushing the roller 24 in a direction of departing from the rotation axis 14 against the biasing force applied by the tension coil spring 28, so that the rotation of the gear wheel 12 is reacted against by a high resistance, while the gear wheel 16 is driving the gear wheel 12 in the forward rotational direction.

When the apex of the cam convex portion 10a passes over the roller 24 such that the cam device comes to the condition partly shown by a phantom line in the figure, the roller 24 in turn drives the cam 10 in the forward rotational direction under the elastic biasing force applied to the lever member 20 by the tension coil spring 28, so that the gear wheel 12 is driven in the forward rotational direction via the engagement of the roller 24 and the cam 10, while a braking is applied by the gear wheel 16 rather than being driven thereby in the forward rotational direction.

Figure 2:
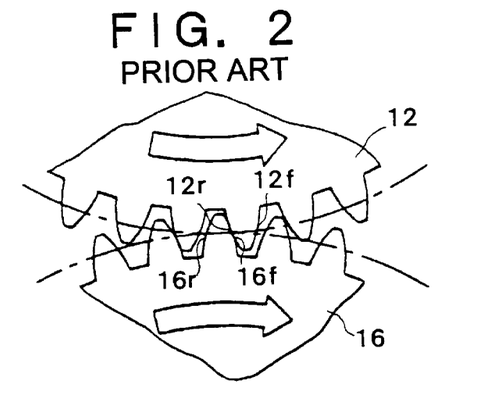
FIG. 2 is a partial view showing the details of the meshing condition of the two gear wheels shown in FIG. 1.

FIG. 2 is a partial view showing the details of the meshing relation between the gear wheels 12 and 16 in the condition where the cam 10 takes the position shown by the solid line in FIG. 1. In this condition, the gear wheel 16 is driving the gear wheel 12 in the forward rotational direction, so that the forwardly viewed front gear face 16f of the gear wheel 16 is in contact with the forwardly viewed rear gear face 12r of the gear wheel 12, with a backlash between the two gear wheels being generated between the forwardly viewed rear gear face 16r of the gear wheel 16 and the forwardly viewed front gear face 12f of the gear wheel 12.

Figure 3:
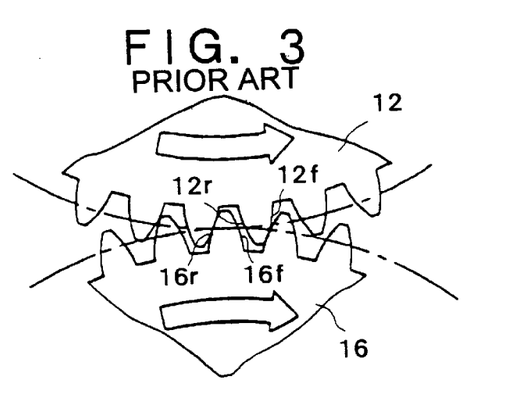
FIG. 3 is a view similar to FIG. 2, showing the condition in which the backlash is reversed from the meshing condition of the gear wheels shown in FIG. 2.

FIG. 3 is a view similar to FIG. 2, showing the meshing relation between the gear wheels 12 and 16 in the condition where the cam 10 takes the position partly shown by the phantom line in FIG. 1. In this condition, the gear wheel 12 is forwardly driven by the elastic biasing force of the tension coil spring 28, so that the gear wheel 16 brakes the forward rotation of the gear wheel 12. Therefore, the forwardly viewed rear gear face 16r of the gear wheel 16 is in contact with the forwardly viewed front gear face 12f of the gear wheel 12, with a backlash being generated between the forwardly viewed front gear face 16f of the gear wheel 16 and the forwardly viewed rear gear face 12r of the gear wheel 12. Thus, during a transition of the cam operation from the condition shown in the solid line to that shown in the phantom line in FIG. 1, i.e. when the contact point between the roller 24 and the cam convex portion 10a has passed somewhat over the apex point of the cam convex portion 10a to come to such a point where the magnitude of the driving torque transmitted from the roller 24 to the cam 10 reaches a critical value, the backlash between the gear wheels 12 and 16 changes from the condition shown in FIG. 2 to that shown in FIG. 3, said critical value being dependent upon the slope angle of the cam surface, etc. In this case, since a certain friction force is acting at the pivotal supports of the roller 24 and the lever member 20, the above-mentioned reversal of the backlash occurs catastrophically when the magnitude of the torque transmitted from the roller 24 to the cam 10 has exceeded a certain relatively large value corresponding to the resistance at the frictionally contacting portions, so that the reversal of the backlash from the condition shown in FIG. 2 to that shown in FIG. 3 occurs impulsively at an instant, at a relatively large torque, thereby generating a noise and/or a vibration.

Thus, a cam device which has a cam and a cam follower shifted by the cam against an elastic biasing force operates to alternately repeat an idling phase region in which the cam does not operatively engage the cam follower so that cam follower is positioned at its return position by the elastic biasing force and a cam operating phase region in which the cam operatively engages the cam follower so that the cam follower is shifted from its return position against the elastic biasing force, and in many cases the cam operating phase region is divided into a first operating phase region in which the cam positively drives the cam follower against the elastic biasing force by the cam engaging the cam follower at an inclining slope portion thereof and a second operating phase region in which the cam is in turn positively driven by the cam follower under the elastic biasing force by the cam engaging the cam follower at a declining slope portion thereof, as in the above-mentioned example. In the cam device in which the cam operating phase region is divided into such first and second operating phase regions, when the cam is rotationally driven about its rotation axis via a gear train including at least two mutually meshing gear wheels as in the example of rotary stencil printer described above, it can happen that the backlash between the two mutually meshing gear wheels is impulsively reversed during a transition of the cam operation from the first operating phase region to the second operating phase region as described above, thereby generating a noise and/or a vibration.

In order to accomplish a low friction, light meshing operation of the gear wheels by substantially completely canceling the backlash between the two meshing gears, the manufacturing precision of the gears and the manufacturing precision and the strength as well as rigidity of the gear support construction including bearing means must be substantially increased. Therefore, in view of a substantial increase of the manufacturing costs, in many applications it is not practical to try to avoid the generation of noise and/or vibration due to the backlash by canceling the backlash from the meshing of the gears.

SUMMARY OF THE INVENTION

The present invention deals with the above-mentioned problems in the cam device in which a cam rotationally driven about its rotation center by a gear train including two mutually meshing gear wheels shifts a cam follower against an elastic biasing force, and has its object in providing a cam device having a means for effectively decreasing the generation of noise and/or vibration due to the backlash without increasing the manufacturing costs of the cam device.

In order to accomplish the above-mentioned object, the present invention proposes a cam device comprising a cam adapted to be driven to rotate about a rotation axis thereof, a cam follower adapted to be shifted by said cam against an elastic biasing force applied thereto, said cam being rotated via a gear train including at least two mutually meshing gear wheels so as to cyclically repeat a first phase of operation in which said cam positively drives said cam follower against said elastic biasing force and a second phase of operation in which said cam is positively driven by said cam follower under the application of said elastic biasing force, and a backlash reversal suppression means adapted to operate only in said second phase of operation so as to suppress a backlash in the mutual meshing of said gear wheels from being impulsively reversed during transition from said first phase of operation to said second phase of operation.

As described above, in the cam device in which a cam rotationally driven about its rotation axis by a gear train including at least two mutually meshing gear wheels shifts a cam follower against an elastic biasing force, it is due to an impulsive reversal of the backlash during a transition of the cam device from the above-mentioned first rotational phase region to said second rotational phase region that a noise and/or a vibration is generated as caused by the backlash of the two mutually meshing gear wheels. Therefore, if there is provided a means which suppresses or dampens the reversal of the backlash only in the above-mentioned second rotational phase region, there should be no problem of noise and/or vibration even when the backlash is left free in the meshing of two gear wheels in the other rotational phase region which occupies the most part of the cam rotation.

Therefore, if a very limited local backlash suppression means is provided as described above, a gear means for driving the cam device manufactured at a relatively low cost and having a relatively large backlash can operate lightly at a low friction as a whole without causing the problem of generation of noise and/or vibration due to the backlash.

The above-mentioned backlash reversal suppression means may be a gear sector superposed on one of said two gear wheels to mesh with the other of said two gear wheels substantially only in said second phase region. It is conventionally know to superpose two gear wheels to be finely adjustable of the relative rotational position thereof so as to be operated as a unitary gear wheel for the purpose of decreasing the backlash. However, if such a backlash reduction measure is applied over the whole circumference of the gear wheel, the manufacturing precision of the gear wheels and the bearing as well as the precision, strength and rigidity of the construction for supporting the bearing for the two meshing gear wheels must also be increased in order to avoid an increase of the resistance of the meshing between the superposed gear wheels and a mating gear wheel.

In contrast, if a gear sector is superposed on a gear wheel such as to cancel the backlash only in the above-mentioned second rotational phase region which occupies only a small part of the whole rotational phase of the gear, it is possible to accomplish a light operation of the gear train, without causing any substantial problem over the entire rotational phase thereof, without substantially increasing the manufacturing precision of the gear and the gear sector and the manufacturing precision, strength and rigidity of the supporting structure therefor.

The above-mentioned backlash reversal suppression means may comprise a first member adapted to rotate integrally with one of said two gear wheels while presenting an arcuate surface coaxial with said one gear wheel, and a second member adapted to rotate integrally with the other of said two gear wheels while presenting an arcuate surface portion coaxial with said other gear wheel and a raised surface portion radially raised from an arcuate contour corresponding to said arcuate surface portion, said raised portion being elasticity pressed against said arcuate surface of said first member substantially only in said second phase of operation, thereby frictionally suppressing said two gear wheels from rotationally shifting relative to one another in said second phase of operation.

Or the above-mentioned backlash reversal suppression means may comprise an elastic spring piece having a root portion supported by one of said two gear wheels and extending in a radial direction of said one gear wheel, and a spring engaging means provided at the other of said gear wheels, said spring piece and said spring engaging means being positioned with respect to rotational phases thereof such that said spring piece is so biased by an engagement with said spring engaging means substantially only in said second phase of operation that a force generated by the biasing of said spring piece biases a driven one of said two gear wheels in a backward rotational direction relative to a driving one of said two gear wheels.

In either of these constructions, the backlash reversal suspension means operates to suppress a relative phase shifting from occurring between two mutually meshing gears in the direction to cause reversal of the backlash therebetween only in the above-mentioned second rotational phase region, by interfering in the mutual meshing of the gear wheels only at a very limited part of the whole rotational phase of the gear wheels, thereby suppressing the backlash between the two gear wheels from impulsively reversing under a condition that a torque for driving the cam is being transmitted between the two gear wheels, while doing nothing with the meshing of the two gear wheels in the other rotational phase region occupying the most part of the rotational phase of the gear wheels, not to interfere with a light low friction operation of the gear train having a relatively large backlash.

BRIEF DESCRIPTION OF THE DRAWINGS

In the accompanying drawings.

DESCRIPTION OF THE EMBODIMENTS

In the following, referring to FIGS. 4 and the subsequent figures, the present invention will be described in detail with respect to some embodiments thereof.

Figure 4:
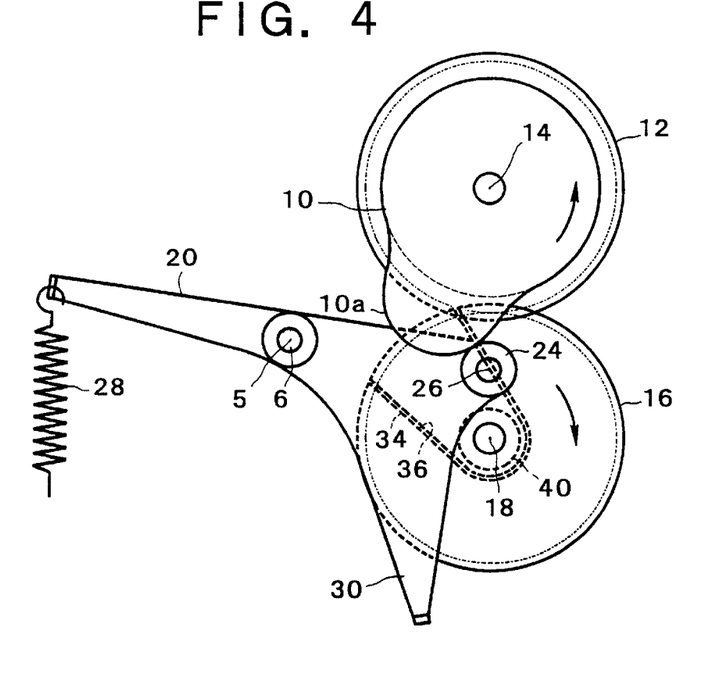
FIG. 4 is a somewhat diagrammatical side view showing a first embodiment of the cam device according to the present invention.
Figure 5:
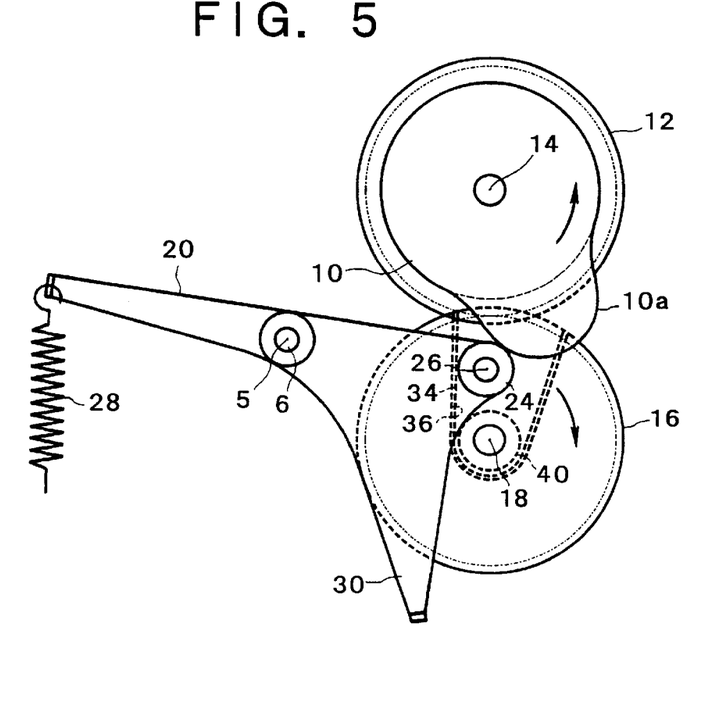
FIG. 5 is a view similar to FIG. 4, showing the device shown in FIG. 4 in an operating condition different from that shown in FIG. 4.

FIGS. 4 and 5 are somewhat diagrammatical side views showing a first embodiment of the cam device according to the present invention, each figure showing only the cam driving mechanism for reciprocating the press roller in synchronization with the rotation of the printing drum of the rotary stencil printer shown in FIG. 1, in which the first embodiment of the present invention is incorporated. In the below-mentioned embodiments, the portions corresponding to those shown in FIG. 1 and described with respect to FIG. 1 operate in the same manner as in FIG. 1, and therefore those corresponding portions are indicated by the same reference numerals as in FIG. 1, and further repetitive descriptions of the constructions and the operations of those portions will be omitted.

Figure 6:
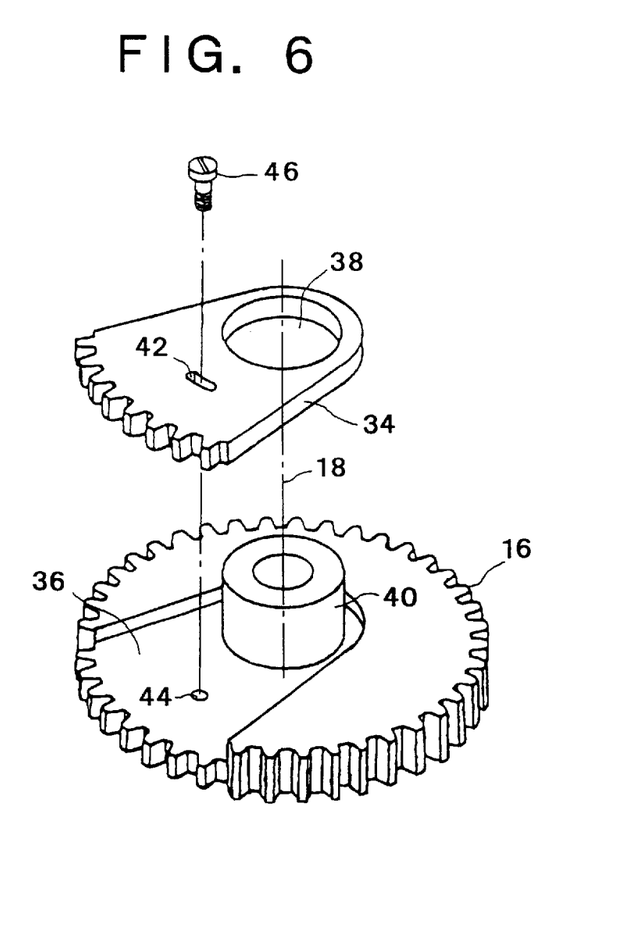
FIG. 6 is a perspective view showing essential portions of the construction of the embodiment shown in FIGS. 4 and 5 in an disassembled condition.
Figure 7:
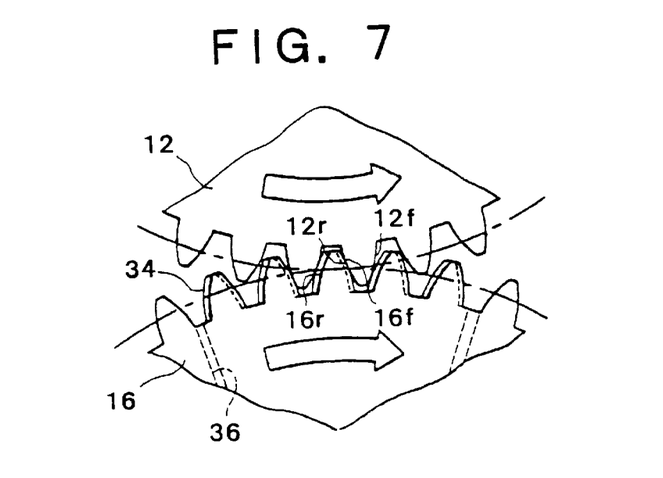
FIG. 7 is a partial view showing the details of the meshing condition of the gear wheels shown in FIG. 5.

In the first embodiment of the present invention shown in FIGS. 4 and 5, at a part of the gear wheel 16 substantially corresponding to a rotational phase region of the meshing of the gear wheels 12 and 16 in which there occurs a phenomenon that the roller 24 drives the cam 10 in the forward rotational direction by the biasing force applied thereto from the expansion coil spring 28, there is provided a gear sector 34 in a manner shown in more detail in FIG. 6. In the embodiment shown in FIG. 6, the gear sector 34 has a thickness of about a half of the thickness of the gear wheel 16 and is received in a sectoral indent 36 formed at a portion receiving the gear wheel 16, with an opening 38 aligned with a central axis of its pitch circle (not shown in the figure but inherent to a gear or gear wheel) being rotationally slidably engaged by a hub portion 40 of the gear wheel 16, so that the relative rotational phase between the gear wheel 16 and the gear sector 34 is finely adjusted and fastened by a screw 46 having a head portion and a threaded shank portion passed through an arcuate through opening 42 formed in the gear sector 34 as centered at the pitch axis being once loosened and screwed at its threaded shank portion into a threaded opening 44 formed in the gear wheel 16. When such a gear sector 34 is mounted to the pertinent rotational phase portion of the gear wheel 16, in the operating condition of the cam device shown in FIG. 5, the meshing between the gear wheels 12 and 16 is held in the condition shown in FIG. 7 so that the backlash between the two gear wheels in this rotational phase region is canceled by the gear sector, whereby when the meshing between the gear wheels 12 and 16 transfers from the rotational phase region in which the cam positively drives the cam follower to the rotational phase position in which cam is in turn positively driven by the cam follower, the meshing condition of the gear wheels does not change from the condition shown in FIG. 2 to the condition shown in FIG. 3 but is changed to the condition shown in FIG. 7 which is substantially the same as the condition shown in FIG. 2. As will be apparent from FIG. 7, the gear sector 34 has gear teeth as substantially the same tooth shape as the gear wheel 16.

When the operation of the cam device proceeds further from the condition shown in FIG. 5 so that the cam convex portion 10a comes to a rotational phase position where it is disengaged from the roller 24, the gear sector 34 does no longer mesh with the gear wheels 12 and 16, so that the backlash in the meshing of the two gear wheels is released free. However, since at this time no substantial torque is transmitted between the two gear wheels in either rotational direction, there is no probability that there occurs an impulsive contact between the gear faces of the two gear wheels which would generate a noise and/or a vibration.

Although the gear sector 34 may be provided on the side of the gear wheel 12 in order to accomplish the same function of suppressing the above-mentioned impulsive reversal of the backlash, in a construction like the rotary stencil printer shown in FIG. 1 in which the gear wheel 12 further meshes with the gear wheel 8 for driving the printing drum 2, it is desirable that the gear sector 34 is provided on the side of the gear wheel 16 as in the shown embodiment, so that a uniform meshing of the gear wheel 12 and the gear wheel 8 is not interfered.

Figure 8:
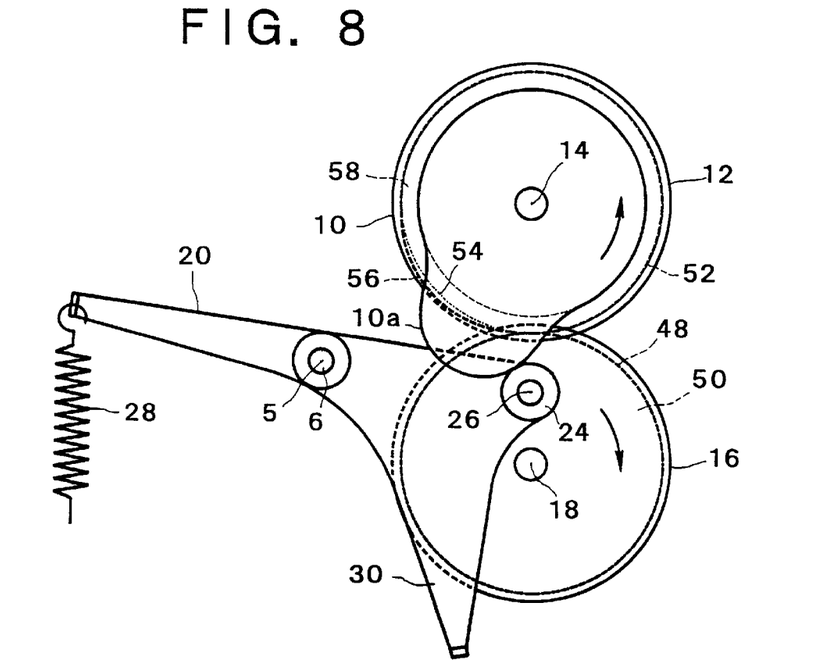
FIG. 8 is a somewhat diagrammatical side view showing a second embodiment of the cam device according to the present invention.
Figure 9:
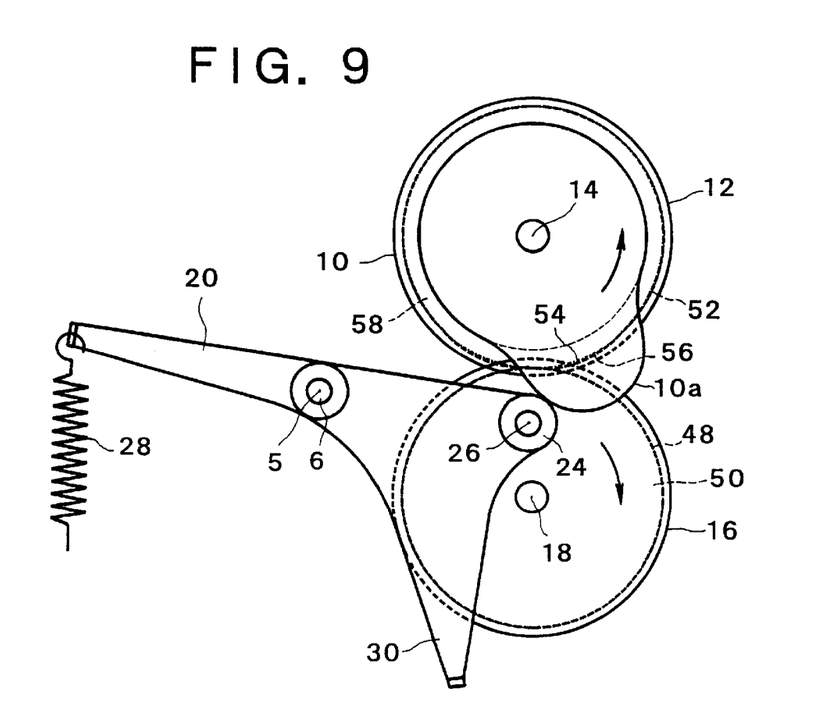
FIG. 9 is a view similar to FIG. 8, showing the device shown in FIG. 8 in an operating condition different from that shown in FIG. 8.

FIGS. 8 and 9 are somewhat diagrammatical side views showing a second embodiment of the cam device according to the present invention, wherein the cam operating condition shown in FIG. 8 corresponds to that shown in FIG. 4, and the cam operating condition shown in FIG. 9 corresponds to that shown in FIG. 5. In FIGS. 8 and 9, the portions corresponding to those shown in FIGS. 4 and 5 are designated by the same reference numerals as in FIGS. 4 and 5, and since the constructions and the operations indicated by the same reference numerals are the same as those in the first embodiment shown in FIGS. 4 and 5, further repetitive descriptions of those portions will be omitted.

In the embodiment shown in FIGS. 8 and 9, the backlash reversal suppression means for suppressing an impulsive reversal of the backlash in the meshing of the gear wheels 12 and 16 which can occur during a transition from the first rotational phase region in which the cam 10 positively drives the roller 24 as shown in FIG. 8 to the second rotational phase region in which the cam 10 is positively driven by the roller 24 as shown in FIG. 9 is constructed by a disk member 50 having a cylindrical surface 48 coaxial with the gear wheel 16 and adapted to rotate integrally with the gear wheel 16 and a generally disk shaped elastic member 58 having a cylindrical surface portion 52 coaxial with the gear wheel 12 and a convex surface portion 56 arcuately raised from the cylindrical contour 54 of the cylindrical surface portion 52 and adapted to rotate integrally with the gear wheel 12.

The cylindrical surface 48 of the member 50 and the cylindrical surface portion 52 of the member 58 have each a diameter equal to or slightly smaller than the diameter of the pitch circle of the gear wheel 16 or 12, so that these two opposing surfaces do not substantially contact one another.

However, the convex surface portion 56 provided to correspond to the rotational phase region in which the cam 10 is driven by the roller 24 so as to oppose the cylindrical surface 48 of the member 50 in said rotational phase region is adapted to be radially compressed to follow the cylindrical surface 48 of the member 50 under an elastic deformation thereof, so that the two members are strongly frictionally engaged with one another, whereby the relative rotational phase between the gear wheels 12 and 16 is maintained at the state thereof where the contact of the two members started, i.e. the condition shown in FIG. 2, or even when the meshing condition changes from the condition shown in FIG. 2 to the condition shown in FIG. 3, the change proceeds moderately, without any impulsive change of the backlash in the meshing of the gear wheels 12 and 16 from the condition shown in FIG. 2 to the condition shown in FIG. 3, thereby definitely avoiding the generating of noise and/or vibration due to an impulsive change of the backlash.

In the embodiment shown in FIGS. 8 and 9, the member 50 presents the cylindrical surface 48 extending over 360°, while the member 58 presents the cylindrical surface 52 extending over the remaining circumference excluding the convex surface portion 56. However, in either of the members 50 and 58 the portions not engaging with the frictional contact of the convex surface portion 56 may be appropriately omitted, such that the member 50 provides only an arcuate surface at a portion to oppose the convex surface portion 56, while the member 58 provides only the convex surface portion 56 and an arcuate surface adjacent the leading end and the trailing end of the convex surface portion, as will be obvious in view of the object, the functions and the effects of the present invention. Therefore, it will be apparent for those of ordinary skill in the art that those modifications are within the scope of the present invention. Further, although the member 50 may be made of a rigid material such as a metal or the like, it will be apparent that the member 50 may also be made of an elastic material. Still further, the member 50 may be made of an elastic material at least at its peripheral portion, while the member 58 in turn may be made of a rigid material such a metal or the like.

Figure 10:
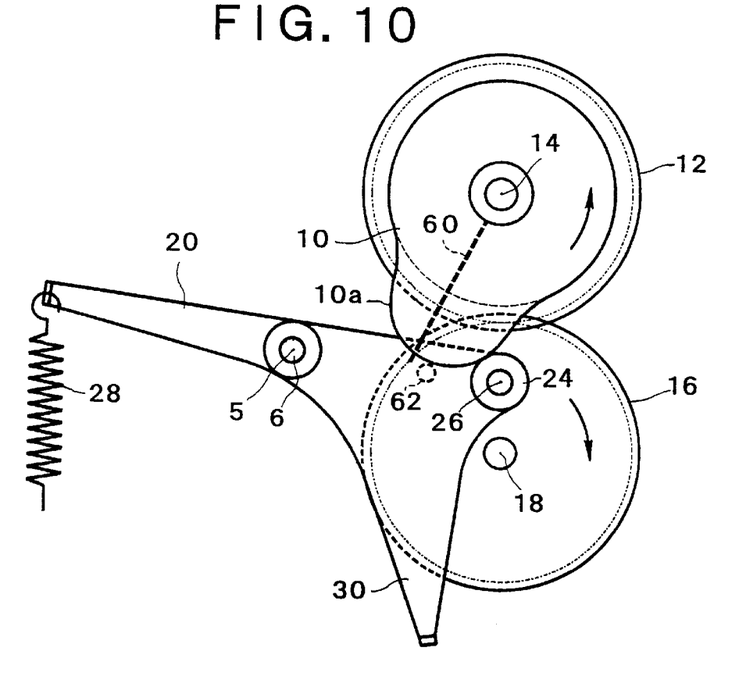
FIG. 10 is a somewhat diagrammatical side view showing a third embodiment of the cam device according to the present invention.
Figure 11:
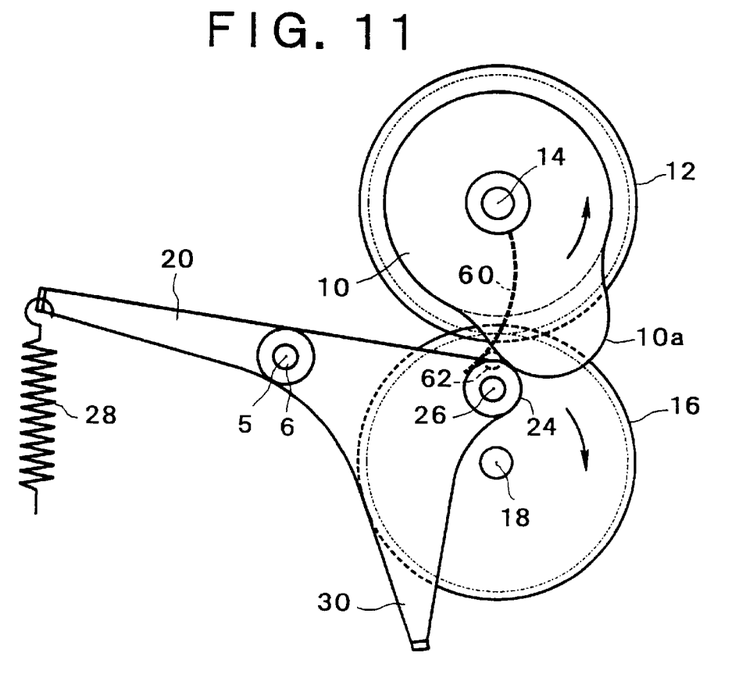
FIG. 11 is a view similar to FIG. 10, showing the device shown in FIG. 10 in an operating condition different from that shown in FIG. 10.

FIGS. 10 and 11 are somewhat diagrammatical side views showing a third embodiment of the cam device according to the present invention, wherein the operating condition shown in FIG. 10 corresponds to that shown in FIGS. 4 or 8, and the operating condition shown in FIG. 11 corresponds to that shown in FIGS. 5 or 9. In FIGS. 10 and 11, the portions corresponds to those of the first and second embodiments are designated by the corresponding reference numerals, and further repetitive descriptions of those common portions will be omitted.

In the embodiment shown in FIGS. 10 and 11, the backlash reversal suppression means for suppressing an impulsive reversal of the backlash in the meshing between the gear wheels 12 and 16 during transition from the first rotational phase region in which the cam 10 positively drives the roller 24 shown in FIG. 10 to the second rotational phase region in which the cam 10 is in turn positively driven by the roller 24 as shown in FIG. 11 comprises a spring piece 60 supported at its root end by the gear wheel 12 to extend in the radial direction of the gear wheel 12 and a spring engaging means 62 provided at the gear wheel 16. When the operation of the cam device transfers from the condition shown in FIG. 10 to that shown in FIG. 11, the spring piece 60 engages the spring engaging means 62, and as the rotation of the two gear wheels proceeds, due to a difference between the mounting phases of the spring piece 60 and the spring engaging means 62 and also due to a deviation of the position of contact between the spring piece and the spring engaging means from a middle point between the rotation centers 14 and 18 of the gear wheels 12 and 16 toward the side of the rotation center 18, the spring piece 50 is deformed to bend such that the spring force generated thereby biases the gear wheel 12 in the retarding direction relative to the gear wheel 16, thereby suppressing an impulsive reversal of the backlash from occurring.

The spring piece 60 may be made of a leaf spring having a certain bending elasticity calculated to be required, while the spring engaging means 62 may be a pin-shaped projection planted in the gear wheel 16 to project therefrom in the axial direction thereof.

In the embodiment shown in FIGS. 10 and 11, the spring piece 60 is provided on the side of the gear wheel 12, while the spring engaging means 62 is provided on the side of the gear wheel 16. However, a variation is possible such that the spring piece 60 is provided on the side of the gear wheel 16, while the spring engaging portion 62 is provided on the side of the gear wheel 12. In this case, the spring piece 60 will engage the spring engaging means 62 at the front face thereof as viewed in the rotational direction of the gear wheel 12, with the direction of the bending of the spring piece 60 being reversal to the direction thereof shown in FIG. 11.

It will be apparent that although the present invention has been described with respect to three kinds of embodiments in the above, the technical concept of providing a cam device immune to the generation of noise and/or vibration due to the backlash in spite of use of an economical driving gear train adapted to operate with a relatively large backlash by providing a backlash reversal suppression means which operates only in a necessary minimum rotational phase region of the whole rotational phase of the gear wheels such as to suppress an impulsive reversal of the backlash between the two mutually meshing gear wheels for rotationally driving the cam during the transition from the first rotational phase region in which the cam positively drives the cam follower to the second rotational phase region in which the cam is positively driven by the cam follower can be reduced to practice by various other constructions readily thought of by one of ordinary skill in the art based upon the embodiments herein disclosed.

I claim:

1. A cam device of a stencil printer having a cylindrical printing drum and a press roller, said printing drum having a raised base portion at a part of the circumference thereof for mounting a leading edge of a stencil sheet, said cam device comprising a rotary cam adapted to be driven to rotate about a rotation axis thereof, a cam follower adapted to be shifted by said cam for selectively biasing said press roller relative to said printing drum, an elastic biasing means for applying an elastic biasing force to said cam follower, a gear train for rotationally driving said printing drum, said gear train including at least first and second mutually meshing gear wheels, said rotary cam being driven via said gear train so as to cyclically repeat a first phase of operation corresponding to a first relative rotation between said first and second gear wheels in which said cam positively drives said cam follower against said elastic biasing force applied thereto by said elastic biasing means for biasing said press roller away from said printing drum not to interfere with said raised base portion when said raised base portion traverses in front of said press roller and a second phase of operation corresponding to a second relative rotation between said first and second gear wheels in which said cam is positively driven by said cam follower under the application of said elastic biasing force, and a backlash reversal suppression means including a gear sector superposed on one of said first and second gear wheels and fixed thereto so as to maintain a predetermined angular relationship thereto, said gear sector having substantially a same gear tooth shape as a gear tooth shape of said one gear wheel to which superposed and being adapted to engage with the other of said first and second gear wheels only in said second phase of operation corresponding to said second relative rotation between said first and second gear wheels so as to suppress a backlash in the mutual meshing of said first and second gear wheels from being impulsively reversed by said biasing force of said biasing means during transition from said first phase of operation to said second phase of operation.

2. A cam device according to claim 1, wherein said one gear wheel has a hub portion aligned with a central axis thereof, while said gear sector has an opening aligned with a central axis of a pitch circle thereof, said opening being adapted to rotatably engage with said hub portion such that said gear sector is rotationally shiftable relative to said gear wheel as centrally aligned therewith by a rotationally slidable engagement of said hub portion and said opening.

3. A cam device according to claim 2, wherein said gear sector is formed with an arcuate through opening centered at the central axis thereof, while said one gear is formed with a threaded opening at a position thereof corresponding to said arcuate through opening of said gear sector, so that said gear sector is fastened to said one gear wheel with an adjustability of relative rotational position thereto by a screw having a head portion and a threaded shank portion being passed through said arcuate opening of said gear sector at said shank portion to be screwed into said threaded opening.

4. A cam device according to claim 3, wherein said one gear wheel is formed with a sectoral indent at a portion thereof receiving said gear sector with said adjustability of relative rotational position therebetween such as to reduce thickness thereof.

* * * * *